US009861114B2

(12) United States Patent
Lallemand et al.

(10) Patent No.: US 9,861,114 B2
(45) Date of Patent: Jan. 9, 2018

(54) FROZEN CONFECTIONERY PRODUCT WITH A NATURAL STABILISER

(75) Inventors: Maud Isabelle Lallemand, Beauvais (FR); Alina Maria Barniol Gutierrez, Beauvais (FR); Nathalie Francoise Le Borgne, Milly sur Therain (FR); Sylvie Penet, Warluis (FR); Max Michel Puaud, Pisseleu (FR); Lynn Heng, Beauvais (FR); Jean-Michel Lacout, Parma (IT)

(73) Assignee: Nestec S.A., Vevey (CH)

( * ) Notice: Subject to any disclaimer, the term of this patent is extended or adjusted under 35 U.S.C. 154(b) by 1031 days.

(21) Appl. No.: 13/813,787

(22) PCT Filed: Jul. 18, 2011

(86) PCT No.: PCT/EP2011/062272
§ 371 (c)(1),
(2), (4) Date: Feb. 1, 2013

(87) PCT Pub. No.: WO2012/016816
PCT Pub. Date: Feb. 9, 2012

(65) Prior Publication Data
US 2013/0129897 A1 May 23, 2013

(30) Foreign Application Priority Data
Aug. 5, 2010 (EP) ..................... 10171992

(51) Int. Cl.
*A23G 9/34* (2006.01)
*A23G 9/32* (2006.01)
*A23G 9/42* (2006.01)
*A23G 9/46* (2006.01)

(52) U.S. Cl.
CPC .................. *A23G 9/34* (2013.01); *A23G 9/32* (2013.01); *A23G 9/42* (2013.01); *A23G 9/46* (2013.01)

(58) Field of Classification Search
CPC ... A23G 9/34; A23G 9/32; A23G 9/42; A23G 9/46
See application file for complete search history.

(56) References Cited

U.S. PATENT DOCUMENTS

| 2,398,950 | A | 4/1946 | Moore |
| 4,804,552 | A | 2/1989 | Ahmed et al. |
| 6,168,819 | B1 | 1/2001 | Zeller et al. |
| 6,605,311 | B2 | 8/2003 | Villagran et al. |
| 6,833,151 | B2 | 12/2004 | Takahashi et al. |
| 2003/0031758 | A1* | 2/2003 | Koss ........................ A23G 9/04 426/72 |
| 2004/0151816 | A1 | 8/2004 | Nana et al. |
| 2009/0142450 | A1 | 6/2009 | Wix |
| 2010/0015290 | A1 | 1/2010 | Spelman et al. |

FOREIGN PATENT DOCUMENTS

| CN | 101449735 | 6/2009 |
| EP | 0345226 | 6/1989 |
| EP | 2025240 A1 | 8/2009 |
| EP | 2119370 A2 | 11/2009 |
| EP | 2153730 A1 | 2/2010 |
| WO | 98/09534 | 3/1998 |
| WO | 2004/016094 | 2/2004 |

OTHER PUBLICATIONS

Arbuckle, W.S. "Ice Cream". Fourth Edition. 1986. Springer Science and Business Media, New York. pp. 1-495.*
Marshall et al. "Chapter 9. Mix Processing" Ice Cream. Fifth Edition., 2000, pp. 139-163, XP002282749.
International Search Report and Written Opinion dated Aug. 16, 2011 for corresponding Intl. Appln. No. PCT/EP2011/062272.

* cited by examiner

*Primary Examiner* — Jenna A Watts
(74) *Attorney, Agent, or Firm* — K&L Gates LLP

(57) ABSTRACT

A frozen confectionary product comprising a natural stabilizer composition is an object of the invention. The frozen confectionary product has an overrun of preferably 0%-120%. The frozen confectionary product comprises a relatively low protein content. The stabilizer composition comprises egg yolk, a gum and preferably an acidifier. Use of the stabilizer composition is described. A method for the manufacture of the frozen confectionary product is also described.

15 Claims, No Drawings

FROZEN CONFECTIONERY PRODUCT WITH A NATURAL STABILISER

CROSS REFERENCE TO RELATED APPLICATIONS

The present application is a National Stage of International Application No. PCT/EP2011/062272, filed on Jul. 18, 2011, which claims priority to European Patent Application No. 10171992.0, filed Aug. 5, 2010, the entire contents of which are being incorporated herein by reference.

FIELD OF INVENTION

The present invention relates to a frozen confectionary product comprising a natural stabiliser composition. The present invention also relates to a method of manufacture for the frozen confectionary product.

BACKGROUND OF THE INVENTION

Stabiliser compositions are used in frozen confectionery products to improve and/or maintain certain characteristics of the products. These characteristics can be the texture, scoopability, melting rate, heat shock resistance and shelf life of the frozen confectionary products.

Efficient stabiliser compositions well known and widely used in any range of frozen confectionary products include ingredients, in particular emulsifiers, defined as "additives" or ingredients with so-called "E-numbers".

Examples of such additives often found in frozen confectionery formulations include mono- and diglycerides of fatty acids, esters of mono- and digylcerides of fatty acids, polyglycerol esters of fatty acids, polysorbates etc. They have certain drawbacks. These emulsifiers are in fact perceived as "non-natural" ingredients, deemed to be unhealthy in the eyes of the consumer. The presence of these ingredients in frozen confection recipes leads to reduced authenticity of the frozen confectionary products. There is therefore a need to provide frozen confectionary products that are made from natural ingredients.

Natural emulsifiers are known but they are often costly and complex materials that are difficult to obtain and manufacture. They are not as efficient as any known additives to stabilize frozen confections and their use is therefore limited.

So-called "Premium" ice creams made with natural ingredients in particular natural emulsifiers such as egg yolk are known. Such "premium" range of frozen confectioneries is usually characterised by products with a rather low overrun e.g. below 50%, high levels of fat and high levels of protein. Their total solid content is also usually above 40 wt %. The low overrun in these products provides them with a low thermal conductivity and therefore these products are less affected by heat shock. On the other hand, the high protein content usually compensates for the need of any "non natural" emulsifier. However the proteins being expensive, this solution is not suitable for standard or "mainstream" frozen confectionary products.

Mainstream frozen confectionary products are usually characterised by an overrun above 80% and their content in protein is lower than that of "premium" frozen confectioneries, to make such products affordable to most consumers.

Providing mainstream frozen confectionary products using natural ingredients is a challenge. Premium ice creams are usually made with fat from a dairy source and contain little or no fat from a vegetable source. These frozen confectionary products are expensive to manufacture and thus costly to the consumer due to the high load of quality ingredients. These products can also be seen as unhealthy due to the high levels of fat and sugars.

There is a need to provide mainstream frozen confectionary products that are healthier, smoother, stable, scoopable with relatively lower total solids, which are made with natural ingredients and which are cheaper to manufacture.

There is an inherent need to provide mainstream frozen confectionary products and stabiliser compositions that address the aforementioned problems.

WO 98/09536 by the Applicant Unilever PLC is titled "Frozen aerated product ice cream free of emulsifier and preparation thereof". The WO 98/09536 publication discloses frozen aerated products with: i) 1-6% fat, ii) 0% emulsifier and iii) 0-1.0% stabilizer such as natural gums. The WO 98/09556 publication fails to disclose any overrun values.

WO 98/09534 by the Applicant Unilever PLC is titled "Frozen aerated product ice cream free of emulsifier and preparation thereof". WO 98/09354 publication discloses frozen aerated products with: i) 6-18% fat, ii) 0% emulsifier and iii) 0-1.0% stabilizer such as natural gums. WO 98/09534 publication fails to disclose any overrun values.

EP 1400176 by the Applicant Unilever PLC is titled "Frozen aerated products". EP 1400176 publication discloses frozen aerated products with a large overrun range of between 10%-250%. The frozen aerated products of EP 1400176 publication do not require any stabilisers or emulsifiers.

US 2006/0233919 by the Applicant Unilever is titled "Methods for production of frozen aerated confections". The US 2006/0233919 publication discloses a method for aerating ice cream that contains polyunsaturated fats. US 2006/0233919 publication fails to disclose a frozen confectionary product with an overrun and a stabiliser composition according to the present invention.

EP 2025240 by the Applicant Nestec SA is titled "Natural stabiliser system for a desert". EP 2025240 publication discloses a stabiliser system that can be used in the manufacture of natural frozen confectionary products. The stabiliser system of EP 2025240 comprises native rice starch and fibres from vegetables, fruits or mixtures thereof. Starch is a carbohydrate and the use of starch is a non traditional component of frozen confectionary products. EP 2025240 publication discloses frozen confectionary products which are aerated with an overrun of 20-80%. EP 2025240 publication fails to disclose a natural gum or at least mixtures of different natural gums in the stabiliser system.

There is thus a need to overcome the deficiencies as known in the prior art.

SUMMARY OF INVENTION

In the context of the invention, "natural" or "clean" is used to designate ingredients that are consumer friendly, ingredients that consumers perceive to fit with ice cream essence/nature and authenticity. As an example, although mono- and diglycerides could be found in nature, they are not considered as "natural" ingredients in the context of the invention.

In a first aspect, the present invention relates to a frozen confectionary product comprising 3% to 12%, preferably 4% to 12%, most preferably 4.4% to 10% fat, 1% to 3%, preferably 2% to 2.7% protein, most preferably 2.4% to 2.7% protein, 0% to 29%, preferably 0% to 26%, most preferably 12% to 26% sugars, 31% to 45%, preferably 34% to 40%, most preferably 36% to 39% total solids, all of these % values being weight %. Furthermore the frozen confectionary product comprises a stabiliser composition. The stabiliser composition comprises egg yolk, optionally at least one acidifier and one or more natural gums. The frozen confectionary product has an overrun of at least 80%, preferably between 80% to 210%, more preferably between 90% to 160%, most preferably between 100% to 150%.

In a further aspect a use of the stabiliser composition in a frozen confectionery is disclosed.

In a further aspect a method for a manufacture of the frozen confectionary product using the stabiliser composition is disclosed.

DETAILED DESCRIPTION OF INVENTION

For a complete understanding of the present invention and the advantages thereof, reference is made to the following detailed description of the invention.

Unless otherwise specified, percentages are meant to designate percentages by weight.

It should be appreciated that various aspects of the present invention are merely illustrative of the specific ways to make and use the present invention and do not limit the scope of the invention when taken into consideration with the claims and the following detailed description.

The present invention relates to a frozen confectionary product with a specific composition. A stabiliser composition used in the frozen confectionary product is also disclosed. A method for the manufacture of the frozen confectionary product is also disclosed.

A first object of the invention is therefore an aerated frozen confectionery product comprising 3% to 12%, preferably 4% to 12%, most preferably 4.4% to 10% fat, 1% to 3%, preferably 2% to 2.7% protein, most preferably 2.4% to 2.7% protein, 0% to 29%, preferably 0% to 26%, most preferably 12% to 26% sugars, 31% to 45%, preferably 34% to 40%, most preferably 36% to 39% total solids, all of these % values being weight %. Furthermore the frozen confectionary product comprises a stabiliser composition. The stabiliser composition comprises egg yolk, optionally at least one acidifier and one or more natural gums. The frozen confectionary product has an overrun of at least 80%, preferably between 80% to 210%, more preferably between 90% to 160%, most preferably between 100% to 150%.

According to a particular embodiment, the product of the invention comprises, per 100 ml serving, 1 g to 8 g, preferably 2 g to 7 g fat, 0.4 g to 1.9 g, preferably 0.5 g to 1.5 g protein, 0 g to 18 g, preferably 0 g to 14 g, most preferably 11 g to 14 g sugars.

The term "frozen confectionary product" includes in particular ice cream, milk shake, Mellorine, frozen yogurt, frozen mousse, frozen fudge, frozen custard, sherbet and other frozen desserts.

The frozen confectionary product comprises fat, protein and sugars. The frozen confectionary product further comprises of a stabiliser composition.

The frozen confectionary product has an overrun of at least 80% preferably between 80% to 210%, more preferably between 90% to 160%, most preferably between 100% to 150%.

Fat as used in the present invention means triglycerides (approximately 98%), together with minor amounts of other components such as phospholipids and diglycerides. Fat can be from a dairy source, a vegetable source or mixtures thereof. Examples of fat include fresh cream, sour cream, cultured cream, butter, concentrated butter, cocoa butter, coconut oil, hazelnut oil, palm oil, rapeseed oil, soybean oil and sunflower oil.

The proteins used in the present invention include milk proteins, soy protein, whey protein, barley protein, and lupin protein. The protein can be any one of the proteins or can be mixtures of the proteins. Preferably, whey protein and/or milk protein are used.

The frozen products of the invention include sugars as part of a sweetening agent. By "sweetening agent" is to be meant a mixture of ingredients which imparts sweetness to the final product. These ingredients include natural sugars like cane sugar, beet sugar, molasses, other plant derived nutritive sweeteners and natural non-nutritive high intensity sweeteners.

In particular, the sugars used in the present invention include mono- and di-saccharides.

The term stabiliser composition is to be understood as a mixture of ingredients which contribute to an overall stability of the frozen confectionary product with respect to parameters such as, but not limited to, ice crystal formation, heat shock resistance, melting profile and organoleptic properties. The stabiliser system of the invention is characterised by the presence of egg yolk, optionally at least one acidifier and at least one natural gum.

The products of the invention have an overrun of at least 80%, preferably between 80% to 210%, more preferably between 90% to 160%, most preferably between 100% to 150%. The overrun is produced by an incorporation of gas into the confectionary product. The gas can be any food grade gas such as air, nitrogen, or carbon dioxide. The overrun is defined as follows: (Reference: Robert T. Marshall, Douglas Goff and Richard W. Hartel, 2003, Ice Cream—6th Edition, Ed. Kluwer Academic/Plenum Publishers (New York), ISBN 0-306-47700-9, page 144.)

$$\% \text{ overrun} = \frac{\text{wt of mix} - \text{wt of same vol. of ice cream}}{\text{wt of same vol. of ice cream}} * 100$$

The stabiliser composition used in the products of the invention comprises egg yolk, at least one natural gum and preferably an acidifier.

Preferably the product of the invention comprises 0.7% to 1.6% egg yolk, up to 10% of at least one acidifier and 0.01% to 0.4%, more preferably 0.05% to 0.3% of at least one natural gum.

The egg yolk can be in the form of an egg yolk powder or liquid egg yolk.

In a further aspect the egg yolk can be sugared.

It is to be appreciated that more than one natural gum can be used and more than one acidifier can be used in the stabiliser composition.

Natural gums obtained from seaweed and used in the present invention include agar, alginic acid, gellan and sodium alginate. It should be noted that the natural gum obtained from seaweed, carrageenan is not used in the present invention.

Natural gums obtained from non-marine botanical resources and used in the present invention include gum arabic, gum ghatti, gum tragacanth, guar gum, locust bean gum, beta-glucan, dammar gum, inulin, glucomannan, mastic gum, psyllium seed husks, pectin, tara gum and quillaia.

Natural gums obtained by bacterial fermentation and used in the present invention include gellan gum and xanthan gum.

According to a particular embodiment, the at least one gum used in the products of the invention is chosen from pectin, guar gum, locust bean gum, tara gum, xanthan gum, Arabic gum, quillaia gum and agar and any mixtures thereof.

According to another embodiment, the at least one gum consists of a mixture of locust bean gum and guar gum.

The present invention does not make use of non-natural additive emulsifiers known in the art, such as mono- and diglycerides of fatty acids, acid esters of mono- and diglycerides of fatty acids, sucrose esters of fatty acids, polygylcerol esters of fatty acids, polyglycerol polyricinoleate and polysorbate.

The acidifier used according to the invention can be an acidic fruit juice, an acidic fruit puree, citric acid, brown sugar, molasses, dried sugar can extract, lactic acid, malic acid or ascorbic acid. The preferred acidifier is a lemon juice concentrate.

Preferably, the pH of the frozen confectionary product is comprised between 5.6 and 6.5, when measured at room temperature (25° C.).

In a further aspect a method for the manufacture of the frozen confectionary product is described.

In a first step of the method, frozen confectionary ingredients 3% to 12%, preferably 4% to 12%, most preferably 4.4% to 10% fat, 1% to 3%, preferably 2% to 2.7% protein, most preferably 2.4% to 2.7% protein, 0% to 29%, preferably 0% to 26%, most preferably 12% to 26% sugars are blended together with a stabiliser composition comprising egg yolk, optionally one acidifier and at least one natural gum to form a mix.

Following formation of the mix, a pasteurisation step and an homogenisation step are carried out on the mix. It is not important in which order the pasteurisation step and the homogenisation step are carried out.

The pasteurisation step is carried out under standard pasteurisation conditions as known in the art.

Homogenisation is preferably carried out under standard conditions, as known in the art, adapting to the fat in the formula, namely at a pressure of between 40 and 250 bars, preferably between 80 and 245 bars, more preferably between 100 and 240 bars.

The homogenised mix may then be cooled to around 2 to 8° C. by known means. The mix may further be aged for 4 to 72 h at around 2 to 6° C. with or without stirring. Optionally, the addition of flavourings, colourings, sauces, inclusions etc. may be carried out prior to the ageing step or during the freezing step. If flavourings, colourings, sauces, inclusions etc. are added, these are preferably selected from natural ingredients only.

In the next step, the mix is aerated. In a preferred embodiment, the mix may be cooled to a temperature below −3° C., preferably between −3 and −10° C., preferably at about −4.5 to −8° C. with stirring and injection of gas to create the desired overrun.

The frozen confectionery is preferably aerated to an overrun of at least 80%, preferably between 80% to 210%, more preferably between 90% to 160%, most preferably between 100% to 150%.

The aerated mix can be subjected to freezing either by using conventional freezing equipment or by a low temperature extrusion system. In this equipment, the aerated mix is cooled by extrusion at a temperature of below −11° C., preferably between −12° C. and −18° C. in a screw extruder. The screw extruder may be such as that described in WO 2005/070225. The extrusion may be performed in a single or twin screw extruder.

The frozen mix is then packaged and stored at temperatures below −20° C., where it will undergo hardening step during storage. Alternatively, it can be hardened by accelerated hardening step, for example via a hardening tunnel, carried out at a temperature between −20° C. to −40° C. for a sufficient time to harden the product.

The present invention is illustrated herein by reference to the following examples.

EXAMPLES

Tests:
Melting tests were carried on frozen confectionary products. The percentage of melted ice cream was measured according to the following formula:

$$\% \, meltedIceCream = \frac{m_4 - m_3}{m_1 - m_2} * 100$$

In which, m1 is the mass of the frozen confectionary product with its package in grams; m2 is the mass of the package alone in grams, m3 is the mass of the container alone in grams and m4 is the mass of the container with the dripped product at a given time in grams.

Heat Shock Test:
Heat shock stresses were applied to samples over 7 days and each heat shock cycle lasted for 24 hours with temperature variations of between −20° C. to −8° C.

The products of the invention are compared in the following example to what is referred to as "standard ice cream" and which is made with additive emulsifiers.

Best quality standard ice cream made with additive emulsifiers (eg: E471) typically shows less than 40% melting after 180 minutes at 22° C.

After heat shock stress, best quality standard ice cream made with additive emulsifiers (eg: E471) typically shows less than 60% melting after 180 minutes.

Example 1

Frozen confectionary products (22 samples) of the following composition were manufactured:

| Ingredients | wt % in the end product |
| --- | --- |
| Fat (coconut and palm) | 4.5%-12% |
| Protein (milk and whey) | 2.4%-2.7% |
| Sugars | 12%-26% |
| Total solids | 36%-40% |
| Emulsifier composition: | |
| Egg yolk (powder) | 0.8%-1.5% |
| Natural gum | 0.3% to 0.63% |
| Acidifier (lemon juice) | 0%-0.15% |

The frozen confectionary products had a pH of between 5.9 and 6.5 and an overrun of between 100 to 120%.

Surprisingly, none of the samples product shrank during standard heat shock tests, indicating a good stability.

The drip test results showed only 20% to 50% melted weight after 180 minutes at 22° C. The majority of the samples with 20% to 40% melted weight indicated a very good melting profile, similar to a best quality ice cream made with efficient additive emulsifiers.

Sensory evaluation was conducted with an expert sensory panel who did not detect major differences on key texture attributes between the ice creams according to the present invention compared to similar control samples made with additive emulsifiers.

Penetrometry tests results showed that these samples had similar hardness to standard ice cream.

Example 2

Three frozen confectionary products with different amounts of acidifier with the following composition were manufactured:

| Ingredients | wt % in the end product |
|---|---|
| Fat (dairy fat) | 10-11% |
| Protein (milk and whey) | 2.7%-3.1% |
| Sugars | 20-22% |
| Total solids | 36-40% |
| Egg yolk | 0.8-1.5% |
| Natural gum (guar & LBG) | 0.18-0.3% |
| Acidifier (lemon juice concentrate 6.8) | 0-0.15% |

The frozen confectioneries could be easily frozen with more than 100% overrun on a standard continuous ice cream freezer.

All samples had good melting resistance with less than 45% melting after 180 min at 22° C.

All 3 frozen confectionery samples had similar penetrometry to standard ice cream.

None of the samples shrank.

Having thus described the present invention in detail, it is to be understood that the detailed description is not intended to limit the scope of the invention thereof. What is desired to be protected by letters patent is set forth in the following claims.

The invention claimed is:

1. A frozen confectionery product comprising:
3% to 12% fat by weight;
2% to 2.7% protein by weight;
0% to 29% sugars by weight;
31% to 45% total solids by weight; and
a stabiliser composition comprising:
0.7% to 1.6% egg yolk by weight;
0.15% to 10% of at least one acidifier by weight; and
0.01% to 0.4% of at least one natural gum by weight, wherein the aerated frozen confectionery product is substantially free of additives selected from the group consisting of mono- and diglycerides of fatty acids, esters of mono- and digylcerides of fatty acids, sucrose esters of fatty acids, polyglycerol esters of fatty acids, polyglycerol polyricinoleate, and polysorbates, and the frozen confectionery product has an overrun of at least 80% and a pH value of 5.6 to 6.5.

2. The frozen confectionery product of claim 1, comprising per 100 ml serving:

1 g to 8 g fat;
0.4 g to 1.9 g protein; and
0 to 18 g sugars.

3. The frozen confectionery product of claim 1, which is selected from the group consisting of ice cream, milk shake, Mellorine, frozen yogurt, frozen mousse, frozen fudge, frozen custard and sherbet.

4. The frozen confectionery product of claim 1, wherein the at least one acidifier is selected from the group consisting of an acidic fruit juice, an acidic fruit puree, citric acid, brown sugar, molasses, dried sugar cane extract, lactic acid, malic acid, ascorbic acid and mixtures thereof.

5. The frozen confectionery product of claim 1, wherein the at least one natural gum is selected from the group consisting of pectin, guar gum, locust bean gum, tara gum, xanthan gum, arabic gum, quillaia gum, agar and mixtures thereof.

6. The frozen confectionery product of claim 5, wherein the at least one natural gum consists of a mixture of guar gum and locust bean gum.

7. The frozen confectionery product of claim 1 comprising 2.4 to 2.7% by weight of the protein.

8. The frozen confectionery product of claim 1, wherein the frozen confectionery product is a non-extruded product.

9. A method for the manufacture of a frozen confectionery product, the method comprising:
providing an ingredient mix comprising 3% to 12% fat by weight, 2% to 2.7% protein by weight, 0% to 29% sugars by weight, 31% to 45% total solids by weight, and a stabiliser composition comprising 0.7% to 1.6% egg yolk by weight, 0.15% to 10% of at least one acidifier by weight and 0.01% to 0.4% of at least one natural gum by weight, wherein the ingredient mix is substantially free of additives selected from the group consisting of mono- and diglycerides of fatty acids, esters of mono- and digylcerides of fatty acids, sucrose esters of fatty acids, polyglycerol esters of fatty acids, polyglycerol polyricinoleate, and polysorbates;
homogenising and pasteurising the mix; and
freezing while aerating the mix, thereby providing an aerated frozen confectionery product, wherein the aerated frozen confectionery product has a pH value of 5.6 to 6.5.

10. The method of claim 9, wherein the freezing step is followed by a dynamic cooling of the mix to a temperature below −11° C.

11. The method of claim 9, wherein the fat is at least an animal derived fat or vegetable derived fat.

12. The method of claim 9, wherein the aerated frozen confectionery product is selected from the group consisting of ice cream, milk shake, Mellorine, frozen yogurt, frozen mousse, frozen fudge, frozen custard and sherbet.

13. The method of claim 9 including the step of hardening the mix after the step of freezing while aerating the mix.

14. The method of claim 9, wherein the ingredient mix comprises 2.4 to 2.7% by weight of the protein.

15. The method of claim 9, wherein the step of freezing while aerating the mix is performed without extrusion.

* * * * *